(12) United States Patent
Zou et al.

(10) Patent No.: US 11,647,426 B2
(45) Date of Patent: May 9, 2023

(54) METHOD AND APPARATUS FOR PROCESSING IAB NODE INFORMATION IN IAB NETWORK

(71) Applicant: ZTE Corporation, Shenzhen (CN)

(72) Inventors: Wei Zou, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 106 days.

(21) Appl. No.: 17/252,872

(22) PCT Filed: Apr. 24, 2019

(86) PCT No.: PCT/CN2019/084091
§ 371 (c)(1),
(2) Date: Dec. 16, 2020

(87) PCT Pub. No.: WO2020/001146
PCT Pub. Date: Jan. 2, 2020

(65) Prior Publication Data
US 2021/0250817 A1 Aug. 12, 2021

(30) Foreign Application Priority Data
Jun. 25, 2018 (CN) .......................... 201810663636.2

(51) Int. Cl.
*H04W 36/00* (2009.01)
*H04W 84/04* (2009.01)

(52) U.S. Cl.
CPC ... *H04W 36/0016* (2013.01); *H04W 36/0055* (2013.01); *H04W 84/047* (2013.01)

(58) Field of Classification Search
CPC ......... H04W 36/0016; H04W 36/0055; H04W 84/047; H04W 40/36; H04W 76/11;
(Continued)

(56) References Cited

U.S. PATENT DOCUMENTS

| 8,804,596 B2* | 8/2014 | Cai | ................... H04W 36/0033 455/442 |
| 9,088,926 B2* | 7/2015 | Liu | ........................ H04W 36/30 |

(Continued)

FOREIGN PATENT DOCUMENTS

| CN | 107736004 A | 2/2018 |
| CN | 107852363 A | 3/2018 |

(Continued)

OTHER PUBLICATIONS

3GPP TSG-RAN WG2 NR AdHoc 1807 Montreal, Canada, Jul. 2-6, 2018, R2-1810208, Consideration on RLC Processing at IAB node. Jul. 2-6, 2018, 3 pages.*

(Continued)

*Primary Examiner* — Ahmed Elallam
(74) *Attorney, Agent, or Firm* — Cantor Colburn LLP

(57) ABSTRACT

Provided are a method and apparatus for processing Integrated Access and Backhaul (IAB) node information in an IAB network, including a second IAB node receives notification information transmitted by a first IAB node, where the notification information includes at least one of: notification information for notifying a connection handover event and/or a connection reestablishment event, and instruction information for instructing to perform Packet Data Convergence Protocol (PDCP) status reporting.

14 Claims, 9 Drawing Sheets

(58) Field of Classification Search
CPC . H04W 36/0005; H04W 36/08; H04W 76/19; H04W 48/16
See application file for complete search history.

(56) References Cited

U.S. PATENT DOCUMENTS

| | | | | |
|---|---|---|---|---|
| 9,088,939 | B2* | 7/2015 | Ulupinar | H04L 69/22 |
| 10,616,092 | B2* | 4/2020 | Ghosh | H04W 40/12 |
| 10,728,780 | B2* | 7/2020 | Keskitalo | H04B 7/15542 |
| 11,039,366 | B2* | 6/2021 | Hong | H04W 40/22 |
| 11,082,329 | B2* | 8/2021 | Majmundar | H04W 40/248 |
| 11,388,768 | B2* | 7/2022 | Cho | H04W 80/02 |
| 11,394,455 | B2* | 7/2022 | Mildh | H04W 84/047 |
| 11,425,599 | B2* | 8/2022 | Teyeb | H04W 88/14 |
| 11,463,937 | B2* | 10/2022 | Wang | H04L 69/324 |
| 11,483,058 | B2* | 10/2022 | Zhu | H04B 7/155 |
| 11,490,321 | B2* | 11/2022 | Wu | H04W 72/085 |
| 2011/0310813 | A1 | 12/2011 | Gage | |
| 2019/0150224 | A1* | 5/2019 | Han | H04W 88/085 |
| | | | | 370/329 |
| 2020/0344666 | A1* | 10/2020 | Wang | H04W 40/22 |
| 2020/0404740 | A1* | 12/2020 | Malkamäki | H04W 76/40 |
| 2021/0051579 | A1* | 2/2021 | Luo | H04W 48/16 |
| 2021/0274381 | A1* | 9/2021 | Teyeb | H04L 1/1685 |
| 2021/0282050 | A1* | 9/2021 | Adjakple | H04L 1/0002 |
| 2021/0377784 | A1* | 12/2021 | Marco | H04W 88/14 |

FOREIGN PATENT DOCUMENTS

| | | | | |
|---|---|---|---|---|
| CN | 110636562 A | * | 12/2019 | ........ H04W 36/0027 |
| CN | 110636628 A | | 12/2019 | |
| EP | 3813320 A1 | * | 4/2021 | ............. H04L 45/64 |

OTHER PUBLICATIONS

Che Bin, "A new routing protocol for the mobile ad-hoc network of the underwater nodes", College of Marine Engineeing, Northwestern Polytechnical University(2007).
ZTE, "Discussion on IAB node discovery and selection", 3GPP TSG-RAN WG2 NR AdHoc 1807, Montreal, Canada, Jul. 2-6, 2018; R2-1810213.
International Search Report for corresponding application PCT/CN2019/084091 filed Apr. 24, 2019; dated Jul. 11, 2019.
Potevio, "The mobility in IAB, R2-1809997", 3GPP TSG-RAN WG2 NR AH1807 Meeting Montreal, Canada, Jun. 22, 2018.
ZTE. "Discussion on IAB Topology Adaption, R2-1810211", 3GPP TSG-RAN WG2 NR AdHoc 1807 Montreal Canada, Jun. 22, 2018.
European Search Report for corresponding application 19 826 186.9; Report dated Jul. 29, 2021.
Potevio: "The Mobility in IAB", 3GPP TSG-RAN WG2 NR AdHoc 1807, Montreal Canada, Jul. 2018 R2-1809997.
ZTE: Consideration on RLC Processing at IAB node, 3GPP TSG-RAN WG2 NR AdHoc 1807, Montreal Canada, Jul. 2018 R2-1810208.

* cited by examiner

METHOD AND APPARATUS FOR PROCESSING IAB NODE INFORMATION IN IAB NETWORK

TECHNICAL FIELD

The present disclosure relates to the field of communications, and in particular to a method and apparatus for processing Integrated Access and Backhaul (IAB) node information in an IAB network.

BACKGROUND

The 5th Generation (5G) telecommunication technologies currently being researched by the 3rd Generation Partnership Project (3GPP) will achieve larger throughput, more user connections, lower delay, higher reliability and lower power consumption (including power consumption of a network side device and a user terminal). At present, in the discussion of the 3GPP, an IAB technology has been approved as a new research program, which aims to implement the effect that one or more User Equipment (UEs), for which an IAB node can serve as a parent node, can be connected to the parent node through local access resources of the UE, and that a multi-hop wireless self-backhauling network can be formed based on the connection between the UE and the parent node to provide backhaul connections for locally accessed UEs of the IAB node.

In a 5G Ultra-Dense Network (UDN) deployment scenario, it is necessary to consider the applicability of different backhaul technologies. Concerning the wired backhaul, in a scenario where a great number of Transport Protocols (TPs) are densely deployed (such as in a dense block), the cost of the wired backhaul may be too high to be acceptable with consideration of the deployment or leasing cost of cables or optical fibers, site selection and maintenance cost and the like. Even though the wired backhaul is paved, due to the less number of users serviced by each node and large load fluctuation in the dense deployment scenario, or due to energy conservation/interference control in the dense deployment scenario, some nodes are opened or closed passively and a backhaul link is in an idle status in most time. However, with the use of content prediction and caching technologies, the fluctuation range required by resources of the backhaul link is also increased, and thus the wired backhaul has low use efficiency and wastes the Capital Expense (CAPEX). For the microwave backhaul, there are also problems of increased hardware cost and additional spectral cost (if an unauthorized spectrum is used, the transmission quality cannot be ensured). In addition, with the low antenna height of a transmission node, a microwave is blocked more easily, and defects such as drastic fluctuation of the quality of the backhaul link are caused.

The wireless self-backhauling technology is one of the important technologies to avoid the above problems and reduce the CAPEX. The self-backhauling technology refers to that a backhaul link and an access link use the same wireless transmission technology, share the same frequency band, and multiplex a resource in a time division or frequency division manner.

Besides, the wireless self-backhauling technology may also be used in a scenario having large wired connection and deployment cost. Five relay architectures are put forward in WA for IAB Architecture for L2/3 relaying (R3-181502) in the RAN3#99 session. In this proposal, the 1a) architecture is to relay a service flow by increasing a Distributed Unit (DU) having a self-backhauling function on the basis of separated Centralized Unit (CU)/DU. FIG. 1 is a schematic diagram of a 3GPP reference relay architecture 1a in the relevant art. As illustrated in FIG. 1, the IAB node provides an access service for a local UE as a DU, and each IAB node is connected to a parent node of an upper level through a local Mobile Terminal (MT). As an access UE of the parent node, the MT shares an access bandwidth with other UEs of the parent node. Since the DU is connected to the CU through an F1 interface, a one-hop or multi-hop data bearer needs to be established between the DU of the IAB node and the CU of an IAB Donor to transmit an F1 message. At each hop, the data bearer transmits the data through a New Radio (NR) User to User (Uu) bearer between the MT and the DU. Hence, for a multi-hop F1 bearer, there is a need for the intermediate IAB node to forward the received F1 message. The forwarding process on the intermediate node may be implemented by an Internet Protocol (IP) layer or an Adapt layer. Specifically, the IP layer or the Adapt layer may forward, according to a target address (such as a target IAB Node Identifier (ID)) or other information of a received data packet, the data packet to the next connection. The IAB Donor is a node having a wired connection, and may include one DU and one CU.

FIG. 2 is a schematic diagram for implementing forwarding by an Adapt layer of an intermediate node in a 3GPP reference relay architecture 1a in the relevant art. As illustrated in FIG. 2, an Adapt layer needs to be added in each IAB node to transmit, receive and forward F1 interface data.

To sum up, the IAB node is a node that provides remote access in the IAB network by using self-backhauling connection. The IAB Donor base station refers to a node having wired core network connection in the IAB network, and other IAB nodes are accessed to a core network through the Donor base station.

However, in a multi-hop IAB network, due to the change of the wireless link, it is possible for the IAB node to be handed over to another upper level node. How to ensure that the IAB node does not lose packets during the handover, restores the backhaul of various services after the handover, and implements downlink notification is a problem unsolved till now in the relevant art.

SUMMARY

Embodiments of the present disclosure provide a method and apparatus for processing IAB node information in an IAB network, which may at least solve the unsolved problem on how to perform downlink notification after an IAB node is handed over to another node due to a change of a wireless link in the relevant art.

According to an embodiment of the present disclosure, a method for processing IAB node information in an IAB network is provided, which may include that: a second IAB node receives notification information transmitted by a first IAB node, wherein the notification information includes at least one of: notification information for notifying a connection handover event and/or a connection reestablishment event, and instruction information for instructing to perform Packet Data Convergence Protocol (PDCP) status reporting.

According to an embodiment of the present disclosure, a storage medium is provided; the storage medium stores a computer program; and the computer program, when being executed, performs a method for processing IAB node information in an IAB network.

According to another embodiment of the present disclosure, a method for processing IAB node information in an IAB network is provided, which may include that: in a process that a first IAB node in the IAB network performs connection handover and/or connection reestablishment from a third IAB node to a fourth IAB node, an IAB Donor node transmits route configuration information to an IAB node relevant to route update, the IAB node relevant to the route update including at least one of: the third IAB node, the fourth IAB node, an IAB node through which an old route used in the IAB network passes before the connection handover and/or connection reestablishment, and an IAB node through which a new route to be used in the IAB network passes after the connection handover and/or connection reestablishment.

According to an embodiment of the present disclosure, a storage medium is provided; the storage medium stores a computer program; and the computer program, when being executed, performs a method for processing IAB node information in an IAB network.

According to still another embodiment of the present disclosure, a method for processing IAB node information in an IAB network is provided, which may include that: after a first IAB node in the IAB network completes connection handover and/or connection reestablishment from a third IAB node to a fourth IAB node, the third IAB node transmits downlink data delivery status information to an IAB Donor node.

According to an embodiment of the present disclosure, a storage medium is provided; the storage medium stores a computer program; and the computer program, when being executed, performs a method for processing IAB node information in an IAB network.

According to still another embodiment of the present disclosure, an apparatus for processing IAB node information in an IAB network is provided, which is applied to a second IAB node in the IAB network, and may include that: after a first IAB node in the IAB network completes connection handover and/or connection reestablishment from a third IAB node to a fourth IAB node, the third IAB node transmits downlink data delivery status information to an IAB Donor node.

According to still another embodiment of the present disclosure, an apparatus for processing IAB node information in an IAB network is provided, which is applied to an IAB Donor node in the IAB network, and may include: a first transmitting module, configured to transmit, in a process that a first IAB node in the IAB network performs connection handover and/or connection reestablishment from a third IAB node to a fourth IAB node, route configuration information to an IAB node relevant to route update, the IAB node relevant to the route update including at least one of: the third IAB node, the fourth IAB node, an IAB node through which an old route used in the IAB network passes before the connection handover and/or connection reestablishment, and an IAB node through which a new route to be used in the IAB network passes after the connection handover and/or connection reestablishment.

According to still another embodiment of the present disclosure, an apparatus for processing IAB node information in an IAB network is provided, which is applied to a third IAB node in the IAB network, and may include: a second transmitting module, configured to transmit, after a first IAB node in the IAB network completes connection handover and/or connection reestablishment from a third IAB node to a fourth IAB node, downlink data delivery status information to an IAB Donor node.

According to still another embodiment of the present disclosure, an electronic apparatus is further provided, which may include a memory and a processor; a computer program is stored in the memory; and the processor is configured to execute the computer program to perform the operations of any above-described method.

By means of the solution provided in the embodiments of the present disclosure, a second IAB node receives notification information transmitted by a first IAB node, wherein the notification information includes at least one of: notification information for notifying a connection handover event and/or a connection reestablishment event, and instruction information for instructing to perform PDCP status reporting. Therefore, the unsolved problem on how to perform downlink notification after an IAB node is handed over to another node due to a change of a wireless link in the relevant art may be solved, and the complete handover of the IAB node is ensured.

BRIEF DESCRIPTION OF THE DRAWINGS

The accompanying drawings are described here to provide a deeper understanding of the present disclosure, and form a part of the present disclosure. The schematic embodiments and description of the present disclosure are adopted to explain the present disclosure, and do not form improper limits to the present disclosure. In the drawings.

DETAILED DESCRIPTION OF THE EMBODIMENTS

The present disclosure is described below in detail with reference to the accompanying drawings and in combination with the embodiments. It is to be noted that the embodiments of the present disclosure and the characteristics of the embodiments may be combined with each other if there is no conflict.

It is to be noted that the terms such as "first" and "second" in the specification, claims and accompanying drawings of the present disclosure are only used to distinguish similar objects, rather than to describe a special order or a precedence order.

Figure 1:
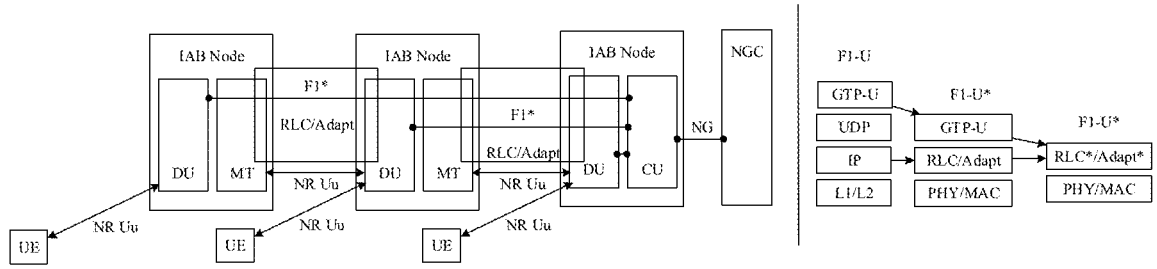
FIG. 1 is a schematic diagram of a 3GPP reference relay architecture 1a in the relevant art.

First of all, the application scenarios and the terms involved in the technical solution of the embodiments of the present disclosure are described. As illustrated in FIG. 1, an IAB node provides an access service for a local UE as a DU, and each IAB node is connected to a parent node of an upper level through a local MT. As an access UE of the parent node, the MT shares an access bandwidth with other UEs of the parent node. Since the DU is connected to the CU through an F1 interface, a one-hop or multi-hop data bearer for transmitting an F1 message needs to be established between the DU of the IAB node and the CU of an IAB Donor. At each hop, the data bearer transmits the data through an NR Uu bearer between the MT and the DU. Hence, for a multi-hop F1 bearer, there is a need for the intermediate IAB node to forward the received F1 message. The forwarding process on the intermediate node may be implemented by an IP layer or an Adapt layer. Specifically, the IP layer or the Adapt layer may forward, according to a target address (such as a target IAB Node ID) or other information of a received data packet, the received data packet to the connection of the next hop. The IAB Donor is a node having wired connection, and may include one DU and one CU.

Figure 2:
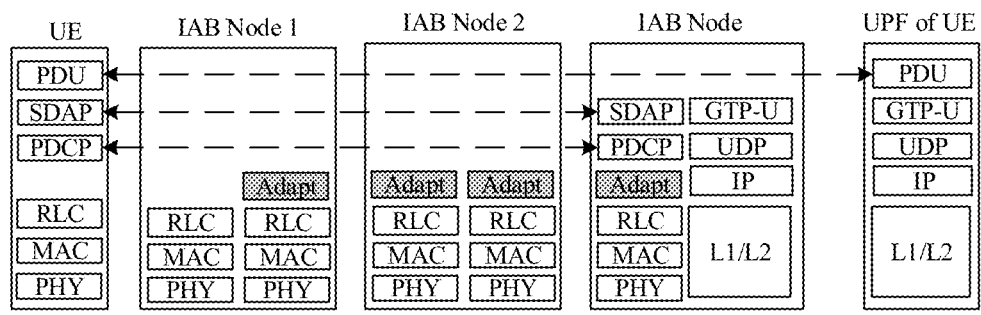
FIG. 2 is a schematic diagram for implementing forwarding by an Adapt layer of an intermediate node in a 3GPP reference relay architecture 1a in the relevant art.

As illustrated in FIG. 2, in the embodiment of the protocol stack architecture, an Adapt layer needs to be added in each IAB node to transmit, receive and forward F1 interface data.

Figure 3:
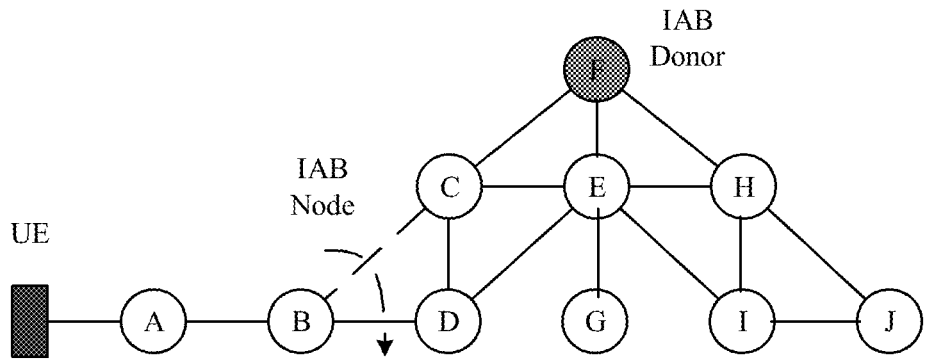
FIG. 3 is a schematic diagram illustrating that one IAB node performs handover according to an embodiment of the present disclosure.

FIG. 3 is a schematic diagram illustrating that one IAB node performs handover according to an embodiment of the present disclosure. As illustrated in FIG. 3, when an IAB node B discovers that the quality of connection with an upper level source IAB node C is reduced, the IAB node B transmits a measurement report, and the upper level source IAB node C transmits the measurement report to the IAB Donor. The IAB Donor determines to hand-over the IAB node B to the upper level target IAB node D according to the topological structure of the IAB network, and transmits corresponding information to the upper level source IAB node C, which then starts a handover procedure.

Embodiment 1

Figure 4:
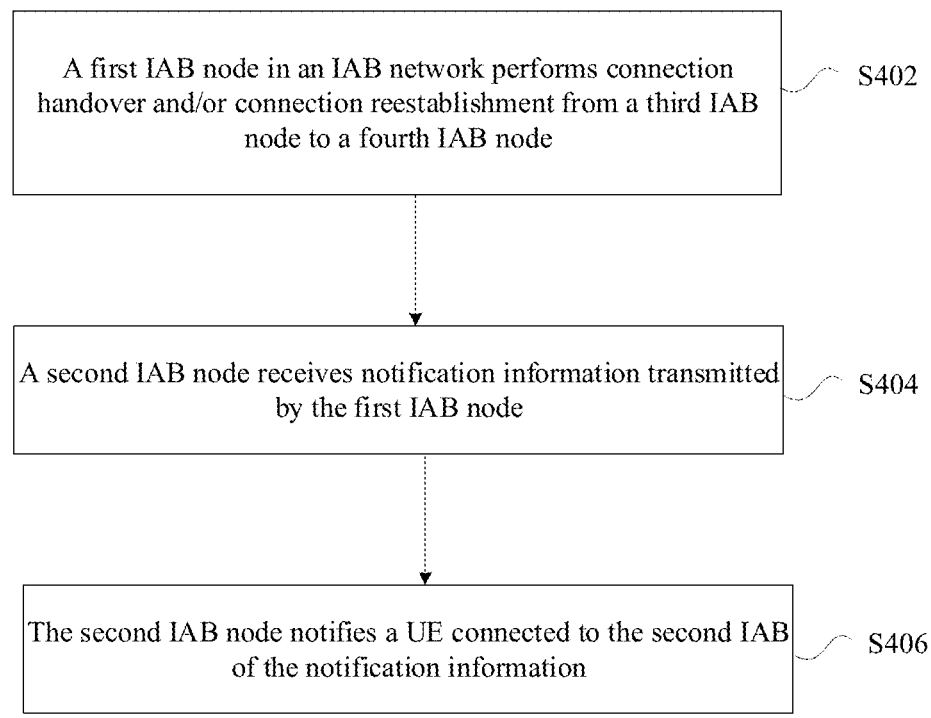
FIG. 4 is a first flowchart of a method for processing IAB node information in an IAB network according to an embodiment of the present disclosure.

The embodiment provides a method for processing IAB node information in an IAB network. FIG. 4 is a first flowchart of a method for processing IAB node information in an IAB network according to an embodiment of the present disclosure. As shown in FIG. 4, the flow may include the following operations.

In operation S402, a first IAB node in an IAB network performs connection handover and/or connection reestablishment from a third IAB node to a fourth IAB node.

In operation S404, a second IAB node receives notification information transmitted by the first IAB node.

In operation S406, the second IAB node notifies a UE connected to the second IAB of the notification information.

The notification information includes at least one of: notification information for notifying a connection handover event and/or a connection reestablishment event, and instruction information for instructing to perform PDCP status reporting.

By means of operation S404, the second IAB node receives the notification information transmitted by the first IAB node, wherein the notification information includes at least one of: the notification information for notifying the connection handover event and/or the connection reestablishment event, and the instruction information for instructing to perform the PDCP status reporting. Therefore, the unsolved problem on how to perform downlink notification after an IAB node is handed over to another node due to a change of a wireless link in the relevant art may be solved, and the complete handover of the IAB node is ensured.

It is to be noted that in an exemplary implementation of the embodiment, the second IAB node receives the notification information through at least one of: an interface between IAB nodes, exchange of a control Protocol Data Unit (PDU) of an Adapt layer, forwarding of a Radio Resource Control (RRC) layer signaling through an IAB Donor, and forwarding of an F1-Access Point (F1-AP) layer signaling through the IAB Donor.

The UE receives the notification information through at least one of: exchange of an RRC layer signaling separately with respective UE, and notification through a broadcast channel.

In an exemplary implementation of the embodiment, before the connection handover and/or connection reestablishment operation is triggered, the method in the embodiment may further include the following operations.

In operation S402-1, an IAB Donor node transmits a UE context modification request message for instructing to hand over to the fourth IAB node.

In operation S402-2, the second IAB node transmits a notification for instructing the connection handover and/or connection reestablishment to the UE.

The embodiment also provides an apparatus for processing the IAB node information in the IAB network. The apparatus is configured to implement the above-mentioned embodiment and exemplary implementations. A content that has been described will no longer be repeated. As used below, the term "module" may implement a combination of software and/or hardware having a predetermined function. Although the apparatus described in the following embodiments is implemented by software preferably, the implementation of hardware or a combination of the software and the hardware may also be conceivable.

Figure 5:
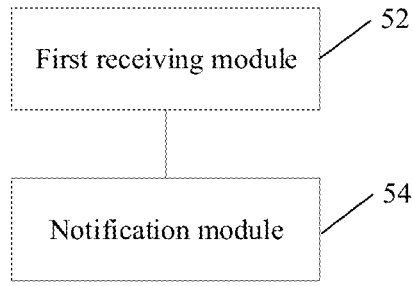
FIG. 5 is a first structural schematic diagram of an apparatus for processing IAB node information in an IAB network according to an embodiment of the present disclosure.

FIG. 5 is a first structural schematic diagram of an apparatus for processing IAB node information in an IAB network according to an embodiment of the present disclosure. The apparatus is applied to a second IAB node in the IAB network. As shown in FIG. 5, the apparatus may include: a first receiving module 52, configured to receive, after a first IAB node in the IAB network completes connection handover and/or connection reestablishment from a third IAB node to a fourth IAB node, notification information notified by the first IAB node and used for notifying the completion of the connection handover and/or connection reestablishment; and a notification module 54, coupled to the first receiving module 52, and configured to notify a UE connected to the second IAB of the notification information.

The notification information includes at least one of: notification information for notifying a connection handover event and/or a connection reestablishment event, and instruction information for instructing to perform PDCP status reporting.

In an exemplary implementation of the embodiment, the second IAB node receives the notification information through at least one of: an interface between IAB nodes, exchange of a PDU of an Adapt layer, forwarding of an RRC layer signaling through an IAB Donor, and forwarding of an F1 AP layer signaling through the IAB Donor.

In addition, the UE receives the notification information through at least one of: exchange of an RRC layer signaling separately with respective UE, and notification through a broadcast channel.

Embodiment 2

Figure 6:
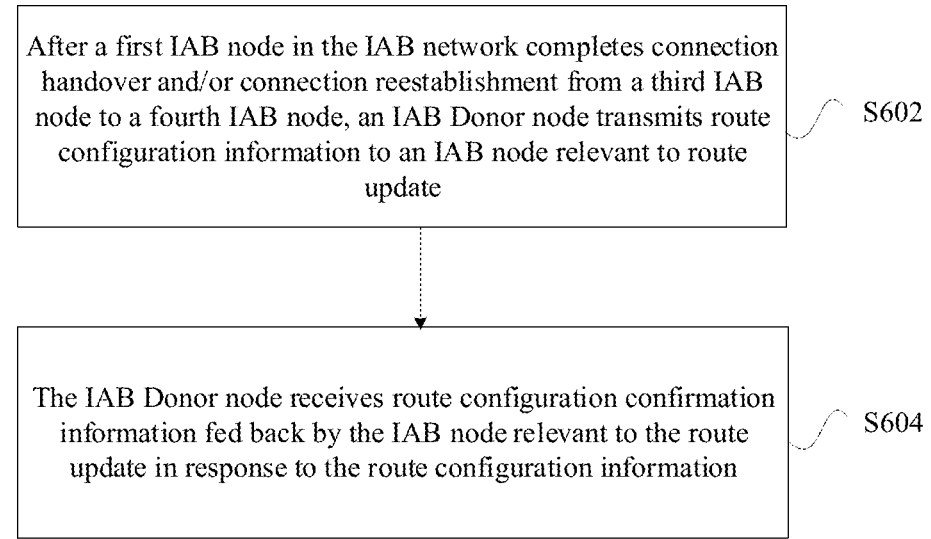
FIG. 6 is a second flowchart of a method for processing IAB node information in an IAB network according to an embodiment of the present disclosure.

The embodiment provides a method for processing IAB node information in an IAB network. FIG. 6 is a second flowchart of a method for processing IAB node information in an IAB network according to an embodiment of the present disclosure. As shown in FIG. 6, the flow may include the following operations.

In operation S602, after a first IAB node in the IAB network completes connection handover and/or connection reestablishment from a third IAB node to a fourth IAB node, an IAB Donor node transmits route configuration information to an IAB node relevant to route update.

In operation S604, the IAB Donor node receives route configuration confirmation information fed back by the IAB node relevant to the route update in response to the route configuration information.

The IAB node relevant to the route update includes at least one of: the third IAB node, the fourth IAB node, an IAB node through which an old route used in the IAB network passes before the connection handover and/or connection reestablishment, and an IAB node through which a new route to be used in the IAB network passes after the connection handover and/or connection reestablishment.

Through operations S602 and S604, after the first IAB node in the network completes the connection handover and/or connection reestablishment from the third IAB node to the fourth IAB node, the route configuration of the IAB node is implemented.

In an exemplary implementation of the embodiment, the method in the embodiment may further include the following operations.

In operation S606, the IAB Donor configures a temporary route, wherein the temporary route is a route from the third IAB node to the fourth IAB node, and temporary route configuration includes route configurations of all IAB nodes in the temporary route.

In operation S608, the third IAB node transmits a downlink data packet, which is not received and not successfully transmitted, to the fourth IAB node through the temporary route.

In operation S610, the third IAB node retransmits the downlink data packet upon the completion of handover.

In the embodiment, the route configuration information includes at least one of: route information deleted after the connection handover and/or connection reestablishment, route configuration information newly configured after the connection handover and/or connection reestablishment, and enablement information of the newly configured route configuration information. The newly configured route configuration information includes: the third IAB node and corresponding next-hop information of a newly configured route, wherein the next-hop information is ID information of a next-hop adjacent IAB node and/or ID information of a Radio Link Control (RLC) entity that carries out transmission to the next-hop adjacent IAB node.

It is to be noted that, in the embodiment, the route configuration information or the route configuration confirmation information may be transmitted via at least one of: an RRC signaling message between the IAB node and the IAB Donor, an F1-AP message between the IAB node and the IAB Donor, and an Adapt layer control message between the IAB node and the IAB Donor.

The embodiment also provides an apparatus for processing the IAB node information in the IAB network. The apparatus is configured to implement the above-mentioned embodiment and exemplary implementations. A content that has been described will no longer be repeated. As used below, the term "module" may implement a combination of software and/or hardware having a predetermined function. Although the apparatus described in the following embodiments is implemented by software preferably, the implementation of hardware or a combination of the software and the hardware may also be conceivable.

Figure 7:
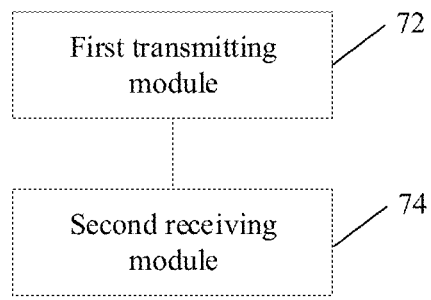
FIG. 7 is a second structural schematic diagram of an apparatus for processing IAB node information in an IAB network according to an embodiment of the present disclosure.

FIG. 7 is a second structural schematic diagram of an apparatus for processing IAB node information in an IAB network according to an embodiment of the present disclosure. The apparatus is applied to an IAB Donor node in the IAB network. As shown in FIG. 7, the apparatus may include: a first transmitting module 72, configured to transmit, in a process that a first IAB node in the IAB network performs connection handover and/or connection reestablishment from a third IAB node to a fourth IAB node, route configuration information to an IAB node relevant to route update; and a second receiving module 74, coupled to the first transmitting module 72, and configured to receive route configuration confirmation information fed back by the IAB node relevant to the route update in response to the route configuration information.

The IAB node relevant to the route update includes at least one of: the third IAB node, the fourth IAB node, an IAB node through which an old route used in the IAB network passes before the connection handover and/or connection reestablishment, and an IAB node through which a new route to be used in the IAB network passes after the connection handover and/or connection reestablishment.

Embodiment 3

The embodiment provides a method for processing IAB node information in an IAB network. The flow may include the following operations.

In operation S802, after a first IAB node in the IAB network completes connection handover and/or connection reestablishment from a third IAB node to a fourth IAB node, the third IAB node transmits downlink data delivery status information to an IAB Donor node.

In operation S804, the third IAB node reads an ID of a bearer of a UE and a PDCP Serial Number (SN) in each data packet at an Adapt layer.

The downlink data delivery status information in the embodiment optionally includes: an ID of each bearer of UE, and at least one of the following information of the bearer: a highest transmitted PDCP SN, a highest delivered PDCP SN, a highest retransmitted PDCP SN, and a highest successfully delivered retransmitted PDCP SN.

The ID of the bearer of the UE includes at least one of: a UE ID and a logic link ID, a UE ID and a bearer ID, a global bearer ID that is configured by the IAB Donor for each bearer of the UE and is unique in the IAB network, and a Tunnel Endpoint (TE) ID.

In an exemplary implementation of the embodiment, the downlink data delivery status information is transmitted through at least one of: an RRC signaling message between the IAB node and the IAB Donor, an F1-AP message between the IAB node and the IAB Donor, and an Adapt layer control message between the IAB node and the IAB Donor.

The embodiment also provides an apparatus for processing the IAB node information in the IAB network. The apparatus is configured to implement the above-mentioned embodiment and exemplary implementations. A content that has been described will no longer be repeated. As used below, the term "module" may implement a combination of software and/or hardware having a predetermined function. Although the apparatus described in the following embodiments is implemented by software preferably, the implementation of hardware or a combination of the software and the hardware may also be conceivable.

The embodiment provides an apparatus for processing IAB node information in an IAB network. The apparatus is applied to a third IAB node in the IAB network, and may include a second transmitting module.

The second transmitting module is configured to transmit, after a first IAB node in the IAB network completes connection handover and/or connection reestablishment from a third IAB node to a fourth IAB node, downlink data delivery status information to an IAB Donor node.

The downlink data delivery status information includes: an ID of each bearer of UE, and at least one of the following information of the bearer: a highest transmitted PDCP SN, a highest delivered PDCP SN, a highest retransmitted PDCP SN, and a highest successfully delivered retransmitted PDCP SN. The ID of the bearer of the UE includes at least one of: a UE ID and a logic link ID, a UE ID and a bearer ID, a global bearer ID that is configured by the IAB Donor for each bearer of the UE and is unique in the IAB network, and a TE ID.

It is to be noted that, in an exemplary implementation of the embodiment, the second transmitting module transmits the downlink data delivery status information through at least one of: an RRC signaling message between the IAB node and the IAB Donor, an F1-AP message between the IAB node and the IAB Donor, and an Adapt layer control message between the IAB node and the IAB Donor.

In an exemplary implementation of the embodiment, the apparatus in the embodiment may further include: a read module, configured to read an ID of a bearer of a UE and a PDCP SN number in each data packet at an Adapt layer. The ID of the bearer of the UE includes at least one of: a UE ID and a logic link ID, a UE ID and a bearer ID, a global bearer ID that is configured by the IAB Donor for each PDCP bearer and is unique in the IAB network, and a TE ID.

By means of the above-mentioned descriptions on the implementation, those skilled in the art may clearly understand that the embodiments of the present disclosure may be implemented by software plus a necessary universal hardware platform according to the methods in Embodiments 1 to 3, and may also be implemented by hardware certainly, but under most conditions, the former is a better implementation. Based on such an understanding, the essence of the technical solutions of the embodiments of the present disclosure, or the part contributing to the conventional art may be implemented in a form of a software product. The computer software product may be stored in a storage medium (such as a Read Only Memory (ROM)/Random Access Memory (RAM), a magnetic disk, and an optical disc) and may include a plurality of instructions for instructing a terminal device (which may be a mobile phone, a computer, a server, or a network device) to execute the methods described in the embodiments of the present disclosure.

It is to be noted that each module may be implemented by software or hardware. The later may be implemented via the following manner but is not limited thereto: the above modules are located in the same processor; or the above modules are respectively located in different processors in any combination form.

Embodiments 1 to 3 are illustrated below in combination with the exemplary implementations of the present disclosure.

Exemplary Implementation

Figure 8:
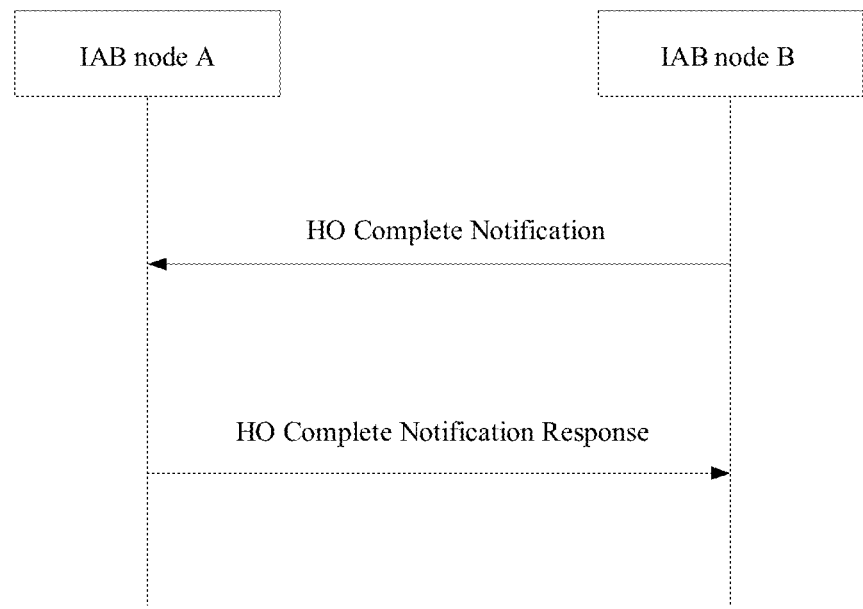
FIG. 8 is a signaling flowchart for performing handover complete notification between two IAB nodes in a multi-hop backhaul link according to an embodiment of the present disclosure.

FIG. 8 is a signaling flowchart for performing handover complete notification between two IAB nodes in a multi-hop backhaul link according to an embodiment of the present disclosure. As shown in FIG. 8, after the IAB node B and the target IAB node C complete a handover operation, in order to start uplink PDCP Status Report as soon as possible, the IAB node B notifies all connected lower level IAB nodes (such as an IAB node A in FIG. 3) of handover complete information. In an exemplary implementation of the embodiment, upon the reception of the handover complete information notification, the IAB node A feeds back a handover complete notification response message. The handover complete information notification message and/or the handover complete notification response message may be implemented through at least one of:

(1) an interface between IAB nodes;
(2) exchange of a PDU of an Adapt layer;
(3) forwarding of an RRC layer signaling through an IAB Donor; and
(4) forwarding of an F1 AP layer signaling through the IAB Donor.

Figure 9:
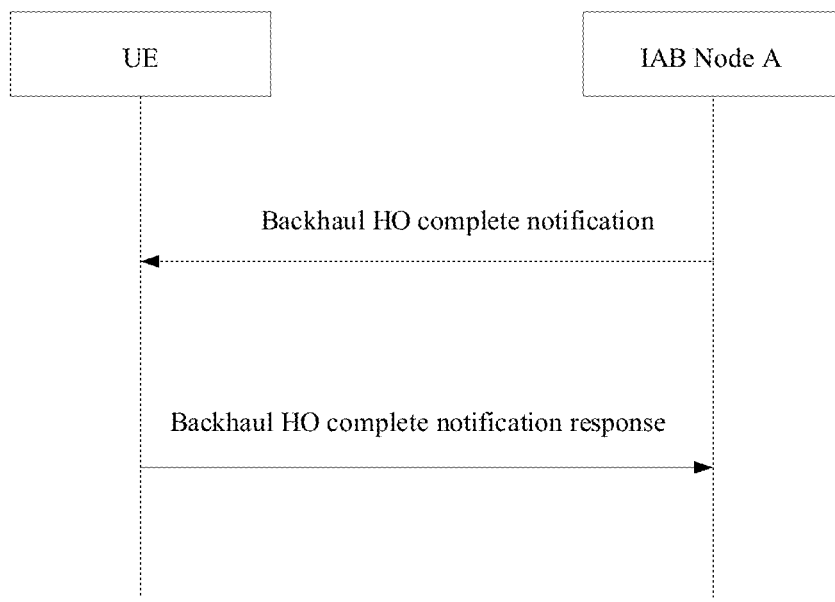
FIG. 9 is a signaling flowchart for performing backhaul link handover complete notification to a UE by an access IAB node according to an embodiment of the present disclosure.

FIG. 9 is a signaling flowchart for performing backhaul link handover complete notification to a UE by an access IAB node according to an embodiment of the present disclosure. As shown in FIG. 9, after the lower level IAB node A receives the handover complete information from the upper level IAB node B, the lower level IAB node A notifies all UEs serviced by the lower level IAB node A of the handover complete information in the backhaul link. The notification may be implemented through at least one of:

(1) exchange of an RRC layer signaling separately with respective UE; and
(2) notification through a broadcast channel.

In an exemplary implementation of the embodiment, the UE may transmit the PDCP Status Report immediately upon the reception of the above notification.

Figure 10:
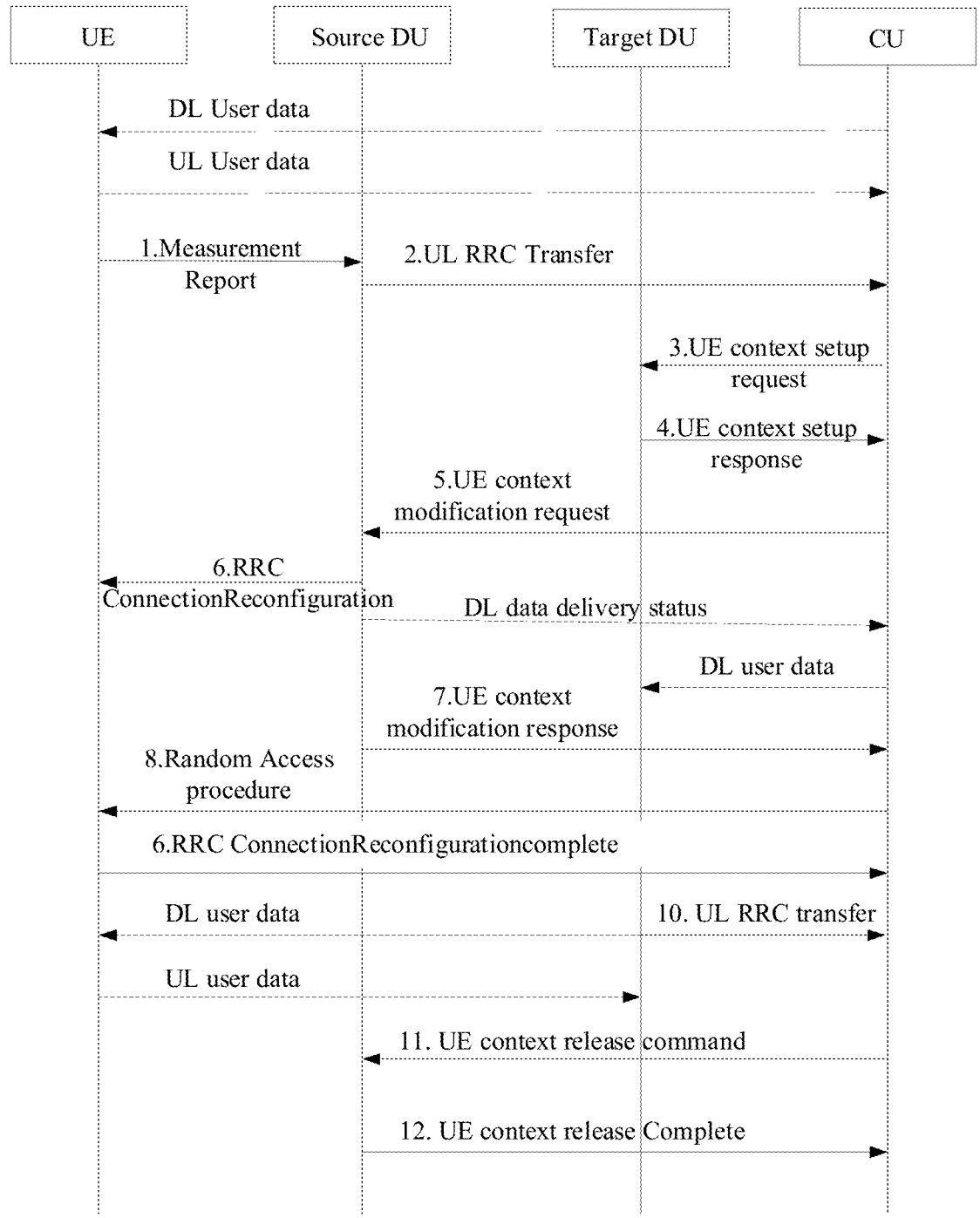
FIG. 10 is a signaling flowchart illustrating DU handover in a case of separated CU/DU provided by an NR standard in the relevant art.

FIG. 10 is a signaling flowchart illustrating DU handover in a case of separated CU/DU provided by an NR standard in the relevant art. As illustrated in FIG. 10, after the UE reports a measurement report, the source DU reports the measurement report to the CU through the F1-AP interface. Upon deciding to conduct handover, the CU performs F1-AP interaction with the target DU to establish a context for the UE for which the handover is to be conducted, and then transmits a UE Context Modification Request to the source DU to start the specific handover procedure. After transmitting the handover notification (RRC Connection Reconfiguration) to the UE, the source DU reports a downlink data delivery status to the CU in a user plane F1-U, and notifies the CU of the highest downlink delivered PDCP SN. The CU transmits the PDCP PDU, which has been transmitted to the source DU but needs to be retransmitted at the target node, to the target DU through the F1-U according to the downlink data delivery status. After the establishment of the connection between the UE and the target DU, the target DU forwards the handover complete message (RRC Connection Reconfiguration Complete) to the IAB Donor, and starts to transmit and receive the user plane data with the UE. Thereafter, the IAB Donor interacts with the source DU to release the UE context on the source DU.

Figure 11:
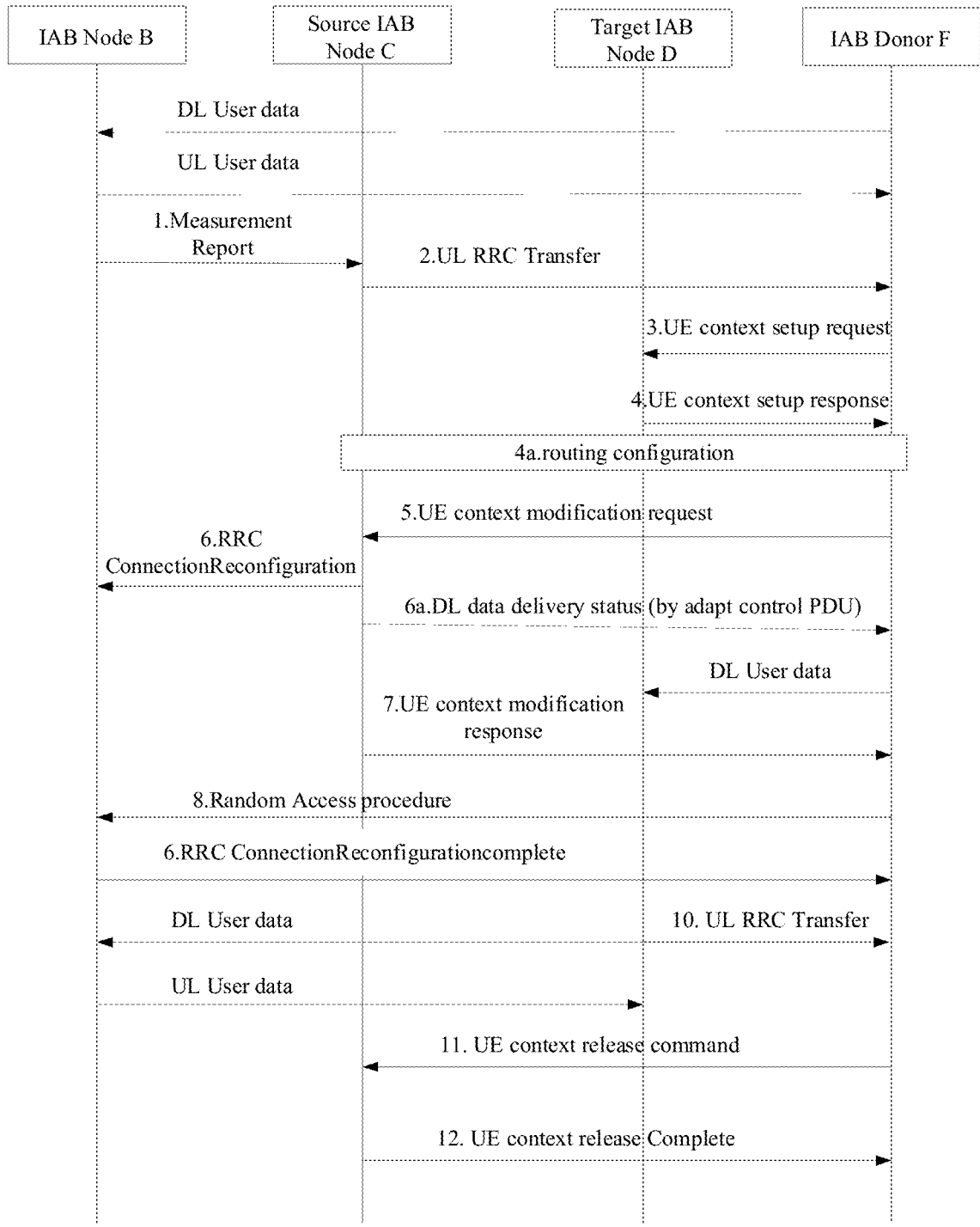
FIG. 11 is a signaling flowchart illustrating transmission of downlink data delivery status information through an Adapt layer control PDU during IAB node handover according to an embodiment of the present disclosure.

FIG. 11 is a signaling flowchart illustrating transmission of downlink data delivery status information through an Adapt layer control PDU during IAB node handover according to an embodiment of the present disclosure. As illustrated in operation 4a of FIG. 11, after the IAB Donor interacts the F1-AP signaling with the upper level target IAB node D to establish a context for the IAB node B, the IAB Donor needs to further perform corresponding route configuration in the upper level target IAB node D, such that the upper level target IAB node D can transmit the received data packet intended for the IAB node B and the IAB node A to the IAB node B. Optionally, the IAB Donor may further perform corresponding route configuration in an upper level IAB node of the upper level target IAB node D, such that the upper level IAB node can transmit the data packet intended for the IAB node B and the IAB node A to the IAB node D. In addition, as illustrated in operation 6a of FIG. 11, in order not to lose the downlink data during the handover, after starting the handover of the IAB node B, i.e., after transmitting the RRC Connection Reconfiguration, the upper level source IAB node C reports the downlink data delivery status information to the IAB Donor through the Adapt layer control PDU.

The downlink data delivery status information may include an ID of each bearer of UE and at least one of the following information of the bearer:

a highest transmitted PDCP SN (e.g., highest transmitted NR PDCP SN);

a highest delivered PDCP SN (e.g., highest delivered NR PDCP SN);

a highest retransmitted PDCP SN (e.g., highest retransmitted NR PDCP SN); and a highest successfully delivered retransmitted PDCP SN (e.g., highest successfully delivered retransmitted NR PDCP SN).

Besides, in the embodiment, the upper level source IAB node may read an ID of a bearer of a UE (i.e., a UE bearer ID) and a PDCP SN number in each backhaul data packet in a cross-layer manner at the Adapt layer. The UE bearer ID of the backhaul of the IAB node may include at least one of:

(1) a UE ID and a logic link ID;
(2) a UE ID and a bearer ID;
(3) a global bearer ID that is configured by the IAB Donor for each bearer of the UE and is unique in the IAB network; and
(4) a TE ID in an F1 interface.

Figure 12:
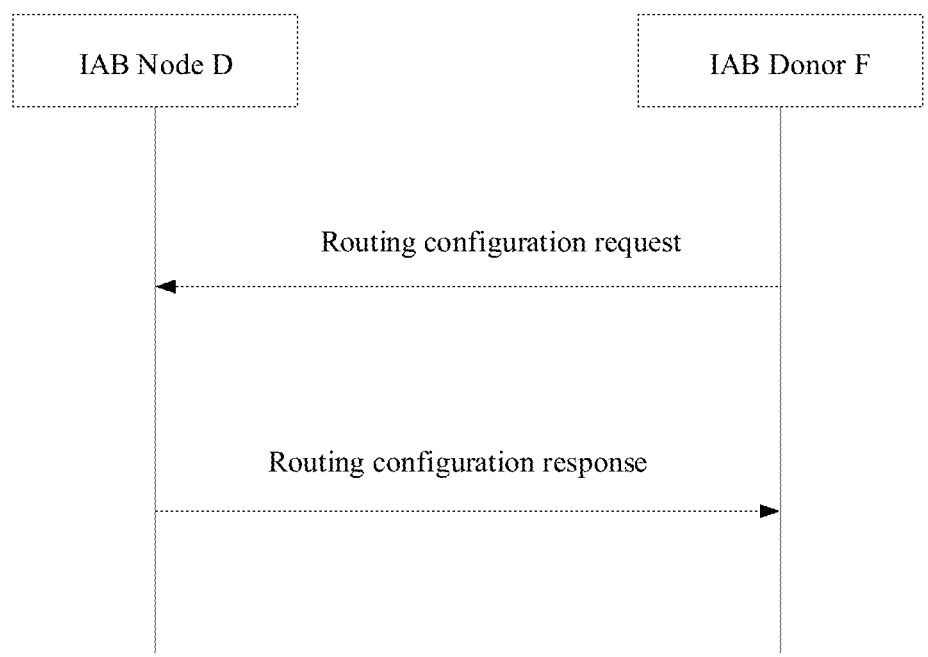
FIG. 12 is a signaling flowchart illustrating that an IAB Donor performs route configuration for an IAB node according to an embodiment of the present disclosure.

FIG. 12 is a signaling flowchart illustrating that an IAB Donor performs route configuration for an IAB node according to an embodiment of the present disclosure. As illustrated in FIG. 12, the IAB Donor transmits a route configuration request message to the IAB node, the message carrying route information in need of being configured. Thereafter, the IAB node transmits a route configuration response message to the IAB Donor, the message being configured to confirm the route configuration request message.

The route configuration information includes at least one of the following information: deletion information of an old route, configuration information of a new route and enablement information of the new route. The configuration information of the new route includes: a target node and corresponding next-hop information of the new route. The next-hop information is ID information of a next-hop adjacent IAB node and/or ID information of an RLC entity that carries out transmission to the next-hop adjacent IAB node.

Additionally, the route configuration request message and/or the route configuration response message may be transmitted through at least one of:

(1) an RRC signaling message between the IAB node and the IAB Donor;
(2) an F1-AP message between the IAB node and the IAB Donor; and
(3) an Adapt layer control message between the IAB node and the IAB Donor.

Figure 13:
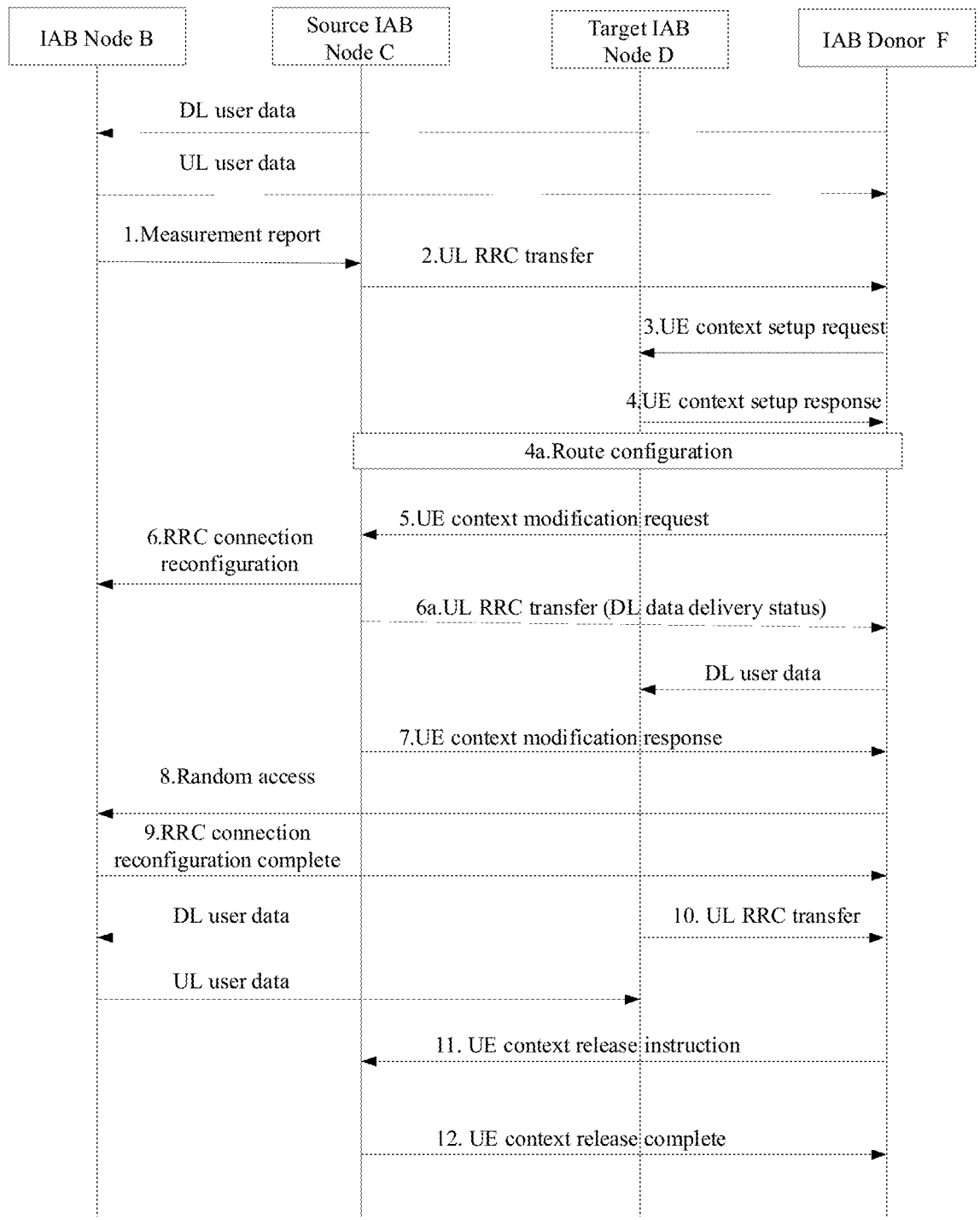
FIG. 13 is a signaling flowchart illustrating transmission of downlink data delivery status information through RRC signaling during IAB node handover according to an embodiment of the present disclosure.

FIG. 13 is a signaling flowchart illustrating transmission of downlink data delivery status information through RRC signaling during IAB node handover according to an embodiment of the present disclosure. As illustrated in operation 4a of FIG. 13, after the IAB Donor interacts the F1-AP signaling with the upper level target IAB node D to establish a context for the IAB node B, the IAB Donor needs to further perform corresponding route configuration in the upper level target IAB node D, such that the upper level target IAB node D can transmit the received data packet intended for the IAB node B and the IAB node A to the IAB node B. Optionally, the IAB Donor may further perform corresponding route configuration in an upper level IAB node of the upper level target IAB node D, such that the upper level IAB node can transmit the data packet intended for the IAB node B and the IAB node A to the IAB node D.

As illustrated in operation 6a of FIG. 13, in order not to lose the downlink data during the handover, after starting the handover of the IAB node B, i.e., after transmitting the RRC Connection Reconfiguration, the upper level source IAB node C reports the downlink data delivery status information to the IAB Donor through an RRC signaling message. The downlink data delivery status information may include an ID of each bearer of UE and at least one of the following information of the bearer:

a highest transmitted PDCP SN (e.g., highest transmitted NR PDCP SN);

a highest delivered PDCP SN (e.g., highest delivered NR PDCP SN);

a highest retransmitted PDCP SN (e.g., highest retransmitted NR PDCP SN); and a highest successfully delivered retransmitted PDCP SN (e.g., highest successfully delivered retransmitted NR PDCP SN).

Besides, the upper level source IAB node for the handover may read an ID of a bearer of a UE (i.e., a UE bearer ID) and a PDCP SN number in each backhaul data packet in a cross-layer manner at the Adapt layer. The UE bearer ID of the backhaul of the IAB node may include at least one of: a UE ID and a logic link ID, a UE ID and a bearer ID, a global bearer ID that is configured by the IAB Donor for each bearer of the UE and is unique in the IAB network, and a TEID in an F1 interface.

Figure 14:
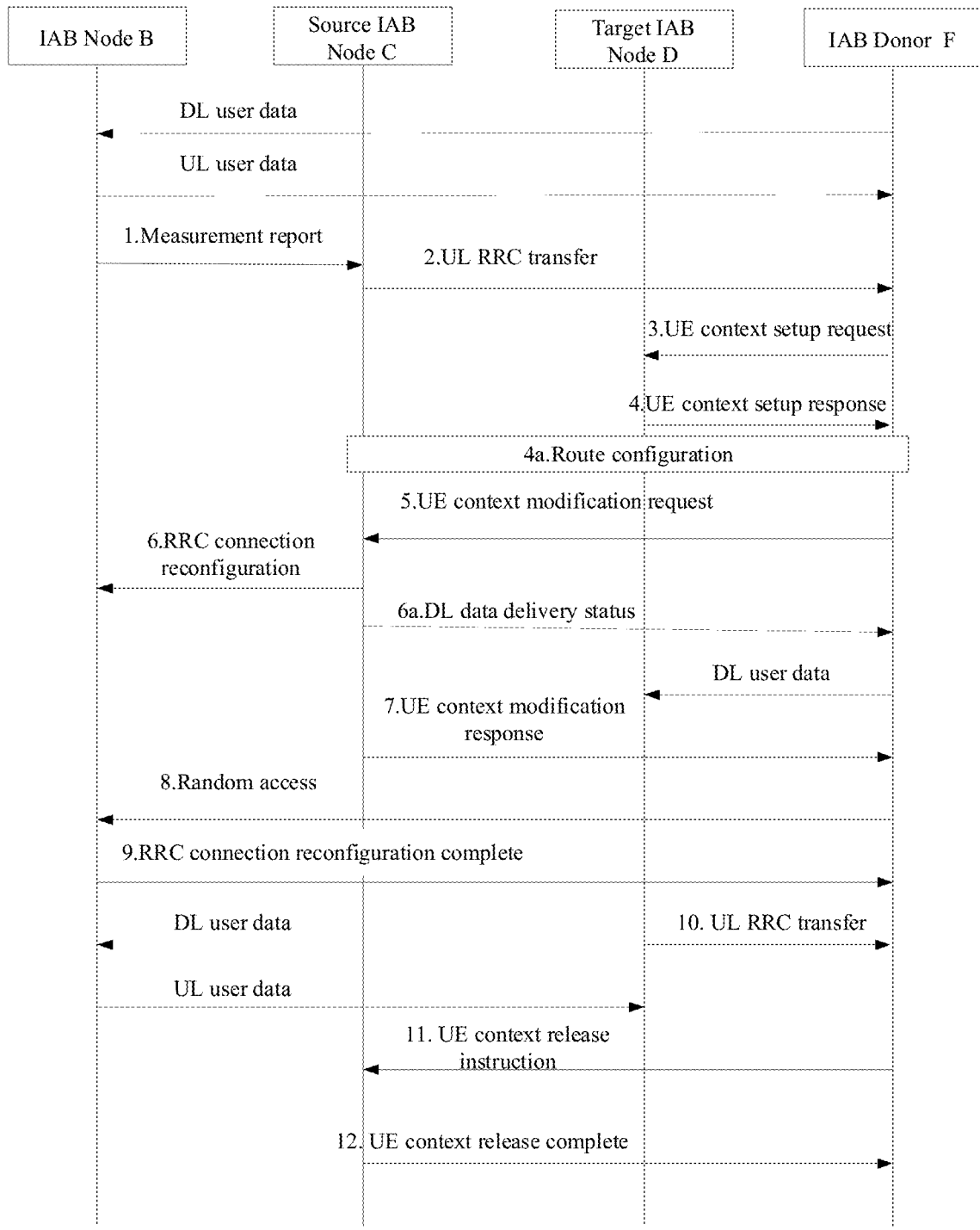
FIG. 14 is a signaling flowchart illustrating transmission of downlink data delivery status information through an F1-AP message during IAB node handover according to an embodiment of the present disclosure.

FIG. 14 is a signaling flowchart illustrating transmission of downlink data delivery status information through an F1-AP message during IAB node handover according to an embodiment of the present disclosure. As illustrated in operation 4a of FIG. 14, after the IAB Donor interacts the F1-AP signaling with the upper level target IAB node D to establish a context for the IAB node B, the IAB Donor needs to further perform corresponding route configuration in the upper level target IAB node D, such that the upper level target IAB node D can transmit the received data packet intended for the IAB node B and the IAB node A to the IAB node B. Optionally, the IAB Donor may further perform corresponding route configuration in an upper level IAB node of the upper level target IAB node D, such that the upper level IAB node can transmit the data packet intended for the IAB node B and the IAB node A to the IAB node D.

As illustrated in operation 6a of FIG. 14, in order not to lose the downlink data during the handover, after starting the handover of the IAB node B, i.e., after transmitting the RRC Connection Reconfiguration, the upper level source IAB node C reports the downlink data delivery status information to the IAB Donor through the F1-AP message.

The downlink data delivery status information may include an ID of each bearer of UE and at least one of the following information of the bearer:

a highest transmitted PDCP SN (e.g., highest transmitted NR PDCP SN);

a highest delivered PDCP SN (e.g., highest delivered NR PDCP SN);

a highest retransmitted PDCP SN (e.g., highest retransmitted NR PDCP SN); and a highest successfully delivered retransmitted PDCP SN (e.g., highest successfully delivered retransmitted NR PDCP SN).

Besides, the upper level source IAB node for the handover may read an ID of a bearer of a UE (i.e., a UE bearer ID) and a PDCP SN number in each backhaul data packet in a cross-layer manner at the Adapt layer. The UE bearer ID of the backhaul of the IAB node may include at least one of: a UE ID and a logic link ID, a UE ID and a bearer ID, a global bearer ID that is configured by the IAB Donor for each bearer of the UE and is unique in the IAB network, and a TEID in an F1 interface.

Figure 15:
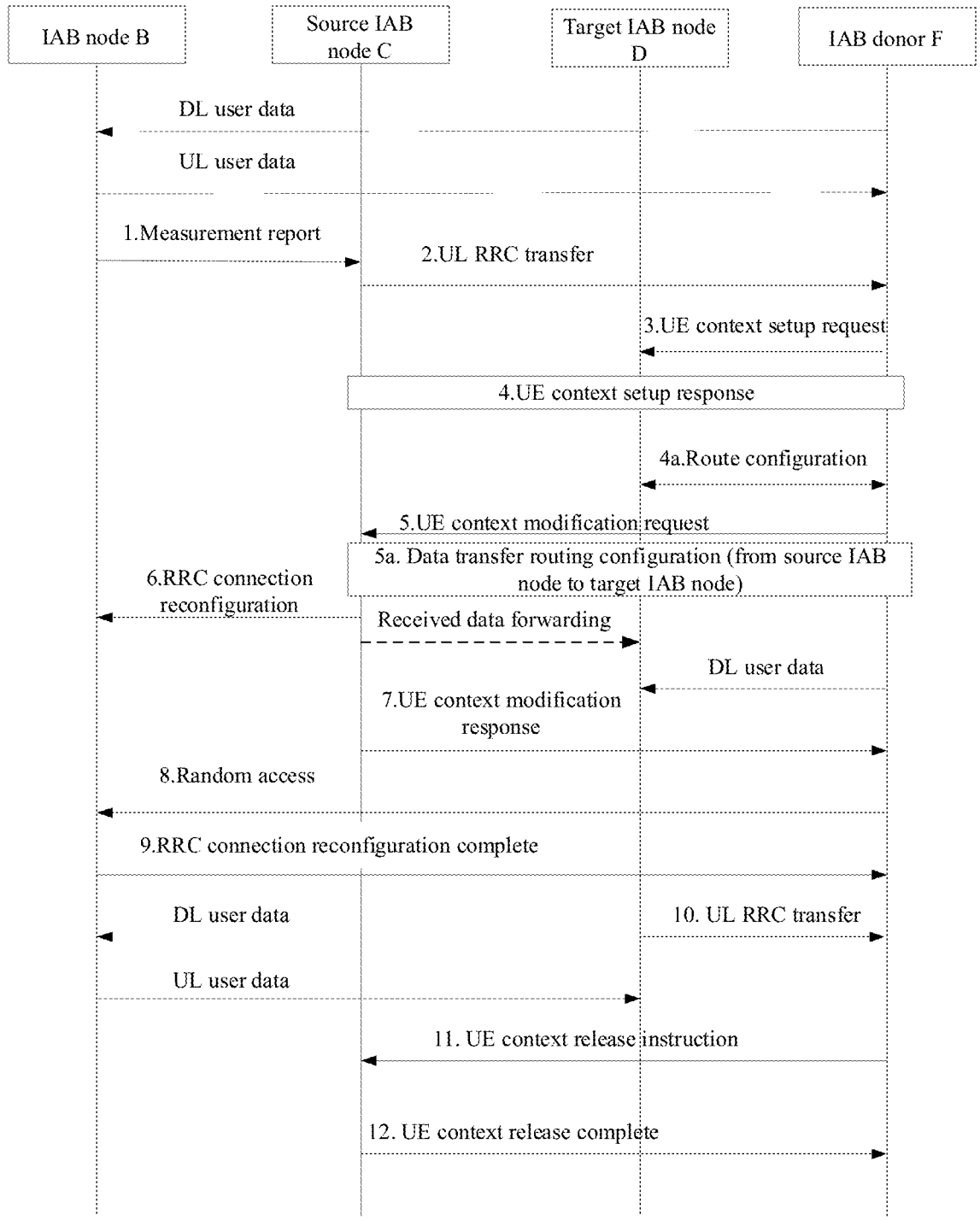
FIG. 15 is a signaling flowchart illustrating delivering, through a temporary route, of a data packet in need of being retransmitted during IAB node handover according to an embodiment of the present disclosure.

FIG. 15 is a signaling flowchart illustrating delivering, through a temporary route, of a data packet in need of being retransmitted during IAB node handover according to an embodiment of the present disclosure. As illustrated in operation 4a of FIG. 15, after the IAB Donor interacts the F1-AP signaling with the upper level target IAB node D to establish a context for the IAB node B, the IAB Donor needs to further perform corresponding route configuration in the upper level target IAB node D, such that the upper level target IAB node D can transmit the received data packet intended for the IAB node B and the IAB node A to the IAB node B. Optionally, the IAB Donor may further perform corresponding route configuration in an upper level IAB node of the upper level target IAB node D, such that the upper level IAB node can transmit the data packet intended for the IAB node B and the IAB node A to the IAB node D.

As illustrated in operation 6a of FIG. 15, in order not to lose the downlink data during handover, the IAB Donor may configure a temporary data forwarding route in the IAB network after confirming the handover of a certain IAB node and transmitting a UE Context Modification Request message. The route is from the upper level source IAB node C of the handover to the upper level target IAB node D of the handover. The temporary route may further pass the IAB Donor. It is to be noted that a temporary route configuration includes route configurations for all IAB nodes in the temporary route. The upper level source IAB node C of the handover delivers a downlink data packet, which is received and not successfully transmitted, to the upper level target IAB node D of the handover through the temporary route, and the upper level target IAB node of the handover retransmits the downlink data packet after the handover is completed.

Embodiment 4

The embodiment of the present disclosure also provides a storage medium. The storage medium stores a computer program. The computer program, when being executed, performs any operation in the method embodiment 1.

In one or more exemplary embodiments, the storage medium may be configured to store a computer program for performing the following operations:

In operation S1, after a first IAB node in a network completes connection handover and/or connection reestablishment from a second IAB node to a third IAB node, a fourth IAB node connected to the first IAB node through a one-hop or multi-hop wireless link receives notification information notified by the first IAB node and configured to indicate completion of the connection handover and/or connection reestablishment.

In operation S2, the fourth IAB node notifies a UE connected to the fourth IAB of the notification information.

The embodiment of the present disclosure also provides a storage medium. The storage medium stores a computer program. The computer program, when being executed, performs any operation in the method embodiment 2.

In one or more exemplary embodiments, the storage medium may be configured to store a computer program for performing the following operations.

In operation S1, after a first IAB node in a network completes connection handover and/or connection reestablishment from a second IAB node to a third IAB node, an IAB Donor node transmits route configuration information to an IAB node relevant to the connection handover and/or connection reestablishment.

In operation S2, the IAB Donor node receives route configuration confirmation information fed back by the IAB node relevant to the route update in response to the route configuration information.

The embodiment of the present disclosure also provides a storage medium. The storage medium stores a computer program. The computer program, when being executed, performs any operation in the method embodiment 3.

In one or more exemplary embodiments, the storage medium may be configured to store a computer program for performing the following operation.

In operation S1, after a first IAB node in a network completes connection handover and/or connection reestablishment from a second IAB node to a third IAB node, the second IAB node transmits downlink data delivery status information to an IAB Donor node.

In one or more exemplary embodiments, the storage medium may include, but is not limited to, various medium capable of storing a computer program, such as a U disk, an ROM, an RAM, a mobile hard disk, a magnetic disk or an optical disc.

The embodiment of the present disclosure also provides an electronic apparatus, which may include a memory and a processor. A computer program is stored in the memory. The processor is configured to execute the computer program to perform any operation of the method embodiment 1.

In one or more exemplary embodiments, the electronic device may further include a transmission device and an input/output device, the transmission device is connected to the processor, and the input/output device is connected to the processor.

In one or more exemplary embodiments, the processor may be configured to execute the computer program to perform the following operations.

In operation S1, a first IAB node in an IAB network performs connection handover and/or connection reestablishment from a third IAB node to a fourth IAB node.

In operation S2, a second IAB node receives notification information transmitted by the first IAB node.

In operation S3, the second IAB node notifies a UE connected to the second IAB of the notification information.

The embodiment of the present disclosure also provides an electronic apparatus, which may include a memory and a processor. A computer program is stored in the memory. The processor is configured to execute the computer program to perform any operation of the method embodiment 2.

In one or more exemplary embodiments, the electronic device may further include a transmission device and an input/output device, the transmission device is connected to the processor, and the input/output device is connected to the processor.

In one or more exemplary embodiments, the processor may be configured to execute the computer program to perform the following operations.

In operation S1, after a first IAB node in a network completes connection handover and/or connection reestablishment from a third IAB node to a fourth IAB node, an IAB Donor node transmits route configuration information to an IAB node relevant to the connection handover and/or connection reestablishment.

In operation S2, the IAB Donor node receives route configuration confirmation information fed back by the IAB node relevant to the route update in response to the route configuration information.

The embodiment of the present disclosure also provides an electronic apparatus, which may include a memory and a processor. A computer program is stored in the memory. The processor is configured to execute the computer program to perform any operation of the method embodiment 3.

In one or more exemplary embodiments, the electronic device may further include a transmission device and an input/output device, the transmission device is connected to the processor, and the input/output device is connected to the processor.

In one or more exemplary embodiments, the processor may be configured to execute the computer program to perform the following operation.

In operation S1, after a first IAB node in a network completes connection handover and/or connection reestablishment from a third IAB node to a fourth IAB node, the third IAB node transmits downlink data delivery status information to an IAB Donor node.

Optionally, the specific example in this embodiment may refer to the examples described in the above embodiments and exemplary implementations, and will no longer be repeated herein.

It is apparent that those skilled in the art should understand that the modules or operations of the present disclosure may be implemented by a general-purpose computing device and centralized in a single computing device or distributed over a network consisting of a plurality of computing devices. In one or more exemplary embodiments, the modules or operations may be implemented by a program code executable by a computing device, so that they may be stored in a storage device and executed by the computing device. Moreover, the operations illustrated or described herein may be executed in an order different from the ones illustrated herein in some cases, or may be implemented by respectively fabricating the operations into respective integrated circuit modules or by fabricating a plurality of modules or operations into a single integrated circuit module. By doing so, the present disclosure is not limited to any specific combination of hardware and software.

The above are only exemplary embodiments of the present disclosure and should not be used for limiting the present disclosure. For those skilled in the art, the present disclosure may have various modifications and changes. Any modifications, equivalent replacements, improvements and the like within the principle of the present disclosure should be included in the scope of protection of the present disclosure.

INDUSTRIAL APPLICABILITY

The present disclosure is applied to the field of communications, may solve the unsolved problem on how to perform downlink notification after an IAB node is handed over to another node due to a change of a wireless link, and can ensure complete handover of the IAB node.

What is claimed is:

1. A method for processing Integrated Access and Backhaul (IAB) node information in an IAB network, the method comprising:
   in a process that a first IAB node in the IAB network performs connection handover and/or connection reestablishment from a third IAB node to a fourth IAB node or after the first IAB node in the IAB network completes the connection handover and/or connection reestablishment from the third IAB node to the fourth IAB node, transmitting, by an IAB Donor node, route configuration information to an IAB node relevant to route update,
   wherein the IAB node relevant to the route update comprises at least one of: the third IAB node, the fourth IAB node, an IAB node through which an old route used in the IAB network passes before the connection handover and/or connection reestablishment, and an IAB node through which a new route to be used in the IAB network passes after the connection handover and/or connection reestablishment.

2. The method as claimed in claim 1, after transmitting, by the IAB Donor node, the route configuration information to the IAB node relevant to the route update, further comprising:
   receiving, by the IAB Donor node, route configuration confirmation information transmitted by the IAB node relevant to the route update.

3. The method as claimed in claim 2, wherein
   the route configuration information or the route configuration confirmation information is transmitted via at least one of: a Radio Resource Control (RRC) signaling message between the IAB node and the IAB Donor, an F1-Access Point (F1-AP) message between the IAB node and the IAB Donor, and an Adapt layer control message between the IAB node and the IAB Donor.

4. The method as claimed in claim 1, further comprising:
configuring, by the IAB Donor node, a temporary route, wherein the temporary route is a route from the third IAB node to the fourth IAB node, and a temporary route configuration comprises route configurations of all IAB nodes in the temporary route.

5. The method as claimed in claim 1, wherein
the route configuration information comprises at least one of: route information deleted after the connection handover and/or connection reestablishment, route configuration information newly configured after the connection handover and/or connection reestablishment, and enablement information of the newly configured route configuration information.

6. The method as claimed in claim 5, wherein
the newly configured route configuration information comprises: the third IAB node and corresponding next-hop information of a newly configured route; and the next-hop information is Identifier (ID) information of a next-hop adjacent IAB node and/or ID information of a Radio Link Control (RLC) entity that carries out transmission to the next-hop adjacent IAB node.

7. A method for processing Integrated Access and Backhaul (IAB) node information in an IAB network, the method comprising:
after a first IAB node in the IAB network completes connection handover and/or connection reestablishment from a third IAB node to a fourth IAB node, transmitting, by the third IAB node, downlink data delivery status information to an IAB Donor node.

8. The method as claimed in claim 7, wherein
the downlink data delivery status information comprises: an Identifier (ID) of each bearer of User Equipment (UE), and at least one of the following information of the bearer: a highest transmitted Packet Data Convergence Protocol (PDCP) Serial Number (SN), a highest delivered PDCP SN, a highest retransmitted PDCP SN, and a highest successfully delivered retransmitted PDCP SN.

9. The method as claimed in claim 8, wherein
the ID of the bearer of the UE comprises at least one of: a UE ID and a logic link ID, a UE ID and a bearer ID, a global bearer ID that is configured by the IAB Donor for each bearer of the UE and is unique in the IAB network, and a Tunnel Endpoint (TE) ID.

10. The method as claimed in claim 8, further comprising:
reading, by the third IAB node, an ID of a bearer of a UE and a PDCP SN in each data packet at an Adapt layer.

11. The method as claimed in claim 7, wherein the downlink data delivery status information is transmitted through at least one of:
a Radio Resource Control (RRC) signaling message between the IAB node and the IAB Donor, an F1-Access Point (F1-AP) message between the third IAB node and the IAB Donor, and an Adapt layer control message between the third IAB node and the IAB Donor.

12. An apparatus for processing Integrated Access and Backhaul (IAB) node information in the IAB network, applied to the IAB Donor node in the IAB network, and the apparatus comprising a processor configured to execute a computer program to perform the operations of the method as claimed in claim 1.

13. An apparatus for processing Integrated Access and Backhaul (IAB) node information in the IAB network, applied to the third IAB node in the IAB network, and the apparatus comprising a processor configured to execute a computer program to perform the operations of the method as claimed in claim 7.

14. A non-transitory storage medium, storing a computer program, wherein the computer program, when being executed, performs the method as claimed in claim 1.

* * * * *